United States Patent
Oldani et al.

(10) Patent No.: US 9,819,041 B2
(45) Date of Patent: Nov. 14, 2017

(54) MIXED METALLIC OXIDES AS SCAVENGERS FOR FLUORINATED ION EXCHANGE POLYMERS

(71) Applicant: SOLVAY SPECIALTY POLYMERS ITALY S.P.A., Bollate (IT)

(72) Inventors: Claudio Oldani, Nerviano (IT); Luca Merlo, Montorfano (IT); Antonio Salvatore Arico, Messina (IT); Claudia D'Urso, Messina (IT); Vincenzo Baglio, Messina (IT)

(73) Assignee: SOLVAY SPECIALTY POLYMERS ITALY S.P.A., Bollate (Milan) (IT)

( * ) Notice: Subject to any disclaimer, the term of this patent is extended or adjusted under 35 U.S.C. 154(b) by 17 days.

(21) Appl. No.: 14/414,321

(22) PCT Filed: Jul. 9, 2013

(86) PCT No.: PCT/EP2013/064430
§ 371 (c)(1),
(2) Date: Jan. 12, 2015

(87) PCT Pub. No.: WO2014/009334
PCT Pub. Date: Jan. 16, 2014

(65) Prior Publication Data
US 2015/0155583 A1 Jun. 4, 2015

(30) Foreign Application Priority Data
Jul. 11, 2012 (EP) .................................. 12175923

(51) Int. Cl.
*C01B 33/113* (2006.01)
*H01M 8/10* (2016.01)
*H01M 8/1041* (2016.01)
*H01M 8/1039* (2016.01)
*H01M 8/1048* (2016.01)
*H01M 8/1018* (2016.01)

(52) U.S. Cl.
CPC ......... *H01M 8/1055* (2013.01); *C01B 33/113* (2013.01); *H01M 8/1039* (2013.01); *H01M 8/1048* (2013.01); *H01M 2008/1095* (2013.01); *H01M 2300/0082* (2013.01)

(58) Field of Classification Search
None
See application file for complete search history.

(56) References Cited

U.S. PATENT DOCUMENTS 6,395,419 B1    5/2002  Kuwahara et al.
7,838,138 B2 *  11/2010 Larson .................. C08J 5/22
                                                   204/263
2002/0039648 A1 * 4/2002  Horpel .................. B01D 61/362
                                                   428/307.7
2003/0008196 A1    1/2003  Wessel et al.
2004/0038105 A1 *  2/2004  Hennige .............. B01D 53/326
                                                   429/495
2007/0065699 A1 *  3/2007  Larson ................... C08J 5/22
                                                   429/494
2007/0213209 A1    9/2007  Siddiqui et al.
2007/0243446 A1   10/2007  Hamrock et al.
2009/0325030 A1 * 12/2009  Hamrock ............ H01M 8/1025
                                                   429/492
2010/0261091 A1   10/2010  Lee et al.
2012/0045704 A1    2/2012  Choudhury

FOREIGN PATENT DOCUMENTS

EP   1172382 A2    1/2002
EP   1323751 A2    7/2003
EP   1662595 A1    5/2006
JP   2003123777 A2 4/2003
WO   9519222 A1    7/1995
WO   9811614 A1    3/1998
WO   2004023576 A2 3/2004
WO   2005060039 A1 6/2005
WO   2009078916 A2 6/2009

OTHER PUBLICATIONS

Takagaki A. et al., "Hydrolysis of sugars using magnetic silica nanoparticles with sulfonic acid groups", Chem. Lett, 2011, vol. 40, p. 1195-1197—The Chemical Society of Japan.
Schlick, S. et al., "Degradation of fuel cell membranes using ESR methods: ex situ and in situ experiments", Polymer Preprints, 2009, vol. 50, No. 2, pp. 745-746.
Zhao, D. et al., "MnO2/SiO2-SO3H nanocomposite as hydrogen peroxide scavenger for durability improvement in proton exchange membranes", Journal of Membrane Science, 2010, vol. 346, No. 1, pp. 143-151—Elsevier BV.
Gill, C.S. et al., "Sulfonic acid-functionalized silica-coated magnetic nanoparticle catalysts", Journal of Catalysis, Academic Press, 2007, vol. 251, No. 1, pp. 145-152—Elsevier Inc.
Arico, A.S. et al., "Surface properties of inorganic fillers for application in composite membranes-direct methanol fuel cells", J. Power Sources, 2004, vol. 128, pp. 113-118—Elsevier BV.
Saswata Bose et al, "Polymer membranes for high temperature proton exchange membrane fuel cell: Recent advances and challenges", Progress in Polymer Science, 2011, vol. 36, No. 6, pp. 813-843—Elsevier Ltd.
Thiam H S et al, "Overview on nanostructured membrane in fuel cell applications", International Journal of Hydrogen Energy, 2010, vol. 36, No. 4, pp. 3187-3205—Elsevier Ltd.

* cited by examiner

*Primary Examiner* — Joseph D Anthony

(57) ABSTRACT

A mixed oxide of Si and at least one metal M comprising inorganic groups —SO$_3$H. The addition of the mixed oxide to fluorinated polymers containing sulfonic acid functional groups increases their stability towards radical degradation when used in fuel cell applications.

16 Claims, No Drawings

MIXED METALLIC OXIDES AS SCAVENGERS FOR FLUORINATED ION EXCHANGE POLYMERS

This application is a U.S. national stage entry under 35 U.S.C. §371 of International Application No. PCT/EP2013/064430 filed Jul. 9, 2013, which claims priority to European application EP12175923.7 filed on 11 Jul. 2012. The entire contents of these applications are explicitly incorporated herein by this reference.

TECHNICAL FIELD

The invention relates to mixed metal oxides capable of improving the resistance of ion exchange fluorinated polymeric membranes used in fuel cell application towards radical degradation. The invention further relates to compositions comprising the mixed oxide and ion exchange fluorinated polymers and to the ion exchange membranes obtained therefrom.

BACKGROUND ART

Fluorinated polymers containing sulfonic acid ion exchange groups, due to their ion conducting properties, have found widespread use in the manufacture of electrolyte membranes for electrochemical devices such as electrolysis cells and fuel cells. Notable examples are for instance proton exchange membrane (PEM) fuel cells which employ hydrogen as the fuel and oxygen or air as the oxidant.

In a typical PEM fuel cell, hydrogen is introduced into the anode portion, where hydrogen reacts and separates into protons and electrons. The membrane transports the protons to the cathode portion, while allowing a current of electrons to flow through an external circuit to the cathode portion to provide power. Oxygen is introduced into the cathode portion and reacts with the protons and electrons to form water and heat.

The membrane requires excellent ion conductivity, gas barrier properties (to avoid the direct mixing of hydrogen and oxygen), mechanical strength and chemical, electrochemical and thermal stability at the operating conditions of the cell. In particular, long-term stability of the membrane is a critical requirement: the lifetime goal for stationary fuel cell applications being up to 40,000 hours of operations, 20,000 hours of operation being the requirement for automotive fuel cell applications.

Attack of the proton exchange membrane by hydrogen peroxide radicals ('OH, 'OOH), which are generated during fuel cell operation, has often been described as one of the causes of membrane degradation. Radical degradation of the membrane contributes to the reduction of the life of service of the fuel cell. It is generally believed that, among other mechanisms, hydrogen peroxide is formed as a result of the reaction between hydrogen and oxygen that permeate through the membrane. Hydrogen peroxide then decomposes to form peroxy and hydroperoxy radicals, see for instance SCHLICK, S., et al. Degradation of fuel cell membranes using ESR methods: ex situ and in situ experiments. *Polymer Preprints*. 2009, vol. 50, no. 2, p. 745-746. Direct formation of the radicals is also believed to be possible.

Several attempts have been made to reduce radical degradation of fluorinated proton exchange membranes, for instance by incorporation into the membrane of suitable metallic salts or oxides. The use of salts of various metals, including rare earth metals, Al and Mn to increase the stability of ion exchange membranes for use in fuel cells is disclosed among others in EP 1702378 A (BDF IP HOLDINGS LTD) Sep. 20, 2006 and EP 1662595 A (TOYOTA CHUO KENKYUSHO) May 31, 2006.

US 20070213209 A (E.I. DU PONT DE NEMOURS) Sep. 13, 2007 discloses compounds for decomposing hydrogen peroxide in a fuel cell membrane electrode assembly which comprise a metal oxide from the group of alumina, silica, titanium oxides, zirconium oxide, manganese dioxide, $Y_2O_3$, $Fe_2O_3$, FeO, tin oxide, copper oxide, nickel oxide, tungsten oxide, germanium oxide, cerium oxides; a stabilizer selected from the group of metal ions and metalloid ions (e.g. boron); and at least one catalyst different from the stabilizer and selected from the group of cerium and ruthenium. The compounds disclosed in US20070213209 are prepared by adsorption of the catalyst on the metal oxide previously modified by the stabiliser. The catalyst particles are thus not incorporated into the crystal lattice of the metal oxide and may thus leach into the membrane and subsequently out of the membrane during the fuel cell operation.

ZHAO, D., et al. MnO2/SiO2-SO3H nanocomposite as hydrogen peroxide scavenger for durability improvement in proton exchange membranes. *J. Membrane Science*. 2010, vol. 346, p. 143-151. discloses nanosized mixed $MnO_2/SiO_2$ oxides having organic sulfonic acid groups grafted on their surface. The compounds are prepared by precipitating $SiO_2$ on the surface of nanosized $MnO_2$ followed by reacting the surface hydroxyl groups of $SiO_2$ with suitable organic sulfonating reagents, such as cyclic sultonic acid esters. In the mixed $MnO_2/SiO_2$ oxide disclosed in Zhao et al. $MnO_2$ is only physically combined with $SiO_2$, this may lead to the reduction of Mn(IV) to Mn(II) during the fuel cell operation and, given the higher solubility of Mn(II) species, to their subsequent removal.

GILL, C. S., et al. Sulfonic acid-functionalized silica-coated magnetic nanoparticle catalysts. *J. Catalysis*. 2007, vol. 251, p. 145-152. discloses hybrid organic/inorganic catalysts comprising organic sulfonic acids grafted onto silica-coated magnetic nanoparticle supports.

In both of the systems described above organic hydrogenated moieties anchor the —$SO_3H$ groups to the $SiO_2$ surface. The presence of these hydrogenated organic moieties in the inorganic oxide is believed to render the system poorly suitable for use in a fuel cell as it may provide an additional source of radical generation or radical degradation in the membrane under the fuel cell highly oxidising operating conditions.

SUMMARY OF INVENTION

It has now been found that the addition of certain mixed oxides of Si and at least one metal M to fluorinated polymers containing sulfonic acid functional groups increases the stability of proton exchange membranes prepared therefrom towards radical degradation without the limitations of the prior art. The increase in stability is reflected in the longer life of service of the membrane when used in a fuel cell.

A first object of the present invention is thus a mixed oxide of Si and at least one metal M, said oxide comprising inorganic groups —$SO_3H$. The metal M is selected from the group consisting of the elements of Group 4, Group 5, Group 6, Group 7, Group 8, Group 9, Group 10, Group 11, Zn, Al, La and Ce. The groups —$SO_3H$ are bound via the sulphur atom to at least one Si, metal M or oxygen atom of the mixed oxide.

A second object of the present invention is a process for the preparation of the mixed oxide of the first object.

A third object of the invention is a composition comprising at least one fluorinated polymer comprising —SO$_2$X functional groups, wherein X is selected from X' or from OZ and wherein X' is selected from the group consisting of F, Cl, Br, I and Z is selected from the group consisting of H, alkaline metals, NH$_4$, and at least one mixed oxide of the first object.

A further object of the present invention is an article, in particular a membrane or an electrocatalyst layer, comprising at least one fluorinated polymer comprising —SO$_2$X functional groups and at least one mixed oxide as defined above.

DISCLOSURE OF INVENTION

A first object of the present invention is a mixed oxide [MO] of Si and at least one metal M comprising inorganic groups —SO$_3$H.

The term "inorganic groups —SO$_3$H" is used herein with reference to the mixed oxide [MO] to indicate that the groups —SO$_3$H present in the mixed oxide [MO] are not bound to organic moieties, wherein the expression "organic moiety" indicates any moiety containing at least one carbon atom. All the groups —SO$_3$H in the mixed oxide [MO] are inorganic groups —SO$_3$H.

Without being bound by theory it is believed that the groups —SO$_3$H are bound via the sulphur atom to the mixed oxide surface. The groups —SO$_3$H are bound via the sulphur atom to at least one Si, metal M or oxygen atom in the mixed oxide. Typically the groups —SO$_3$H are bound via the sulphur atom to at least a portion of the metal M in the mixed oxide [MO]. The presence of the bound groups —SO$_3$H on the surface of the mixed oxide [MO] has been correlated to the shift towards higher binding energy values in the X-ray photoelectron spectra of the oxygen atoms in the mixed oxide [MO] with respect to those of SiO$_2$. As discussed in ARICO', A. S., et al. Surface properties of inorganic fillers for application in composite membranes-direct methanol fuel cells. *J. Power Sources*. 2004, vol. 128, p. 113-118. such a shift can be correlated to the higher acidity of the oxide surface.

The at least one metal M in the mixed oxide [MO] is selected from the group consisting of the elements of Group 4, Group 5, Group 6, Group 7, Group 8, Group 9, Group 10, Group 11 of the periodic table, Al, Zn, La and Ce. For the avoidance of doubts the notation "Group N" of the periodic table refers to the standard IUPAC nomenclature of the elements. As an example expression "Group 4 elements" is intended to denote the elements Ti, Zr and Hf.

Preferably the at least one metal M is selected from the group consisting of Zr, Hf, V, Nb, Ta, Cr, Mo, W, Mn, Re, Ru, Co, Rh, Ir, Ni, Pd, Pt, Cu, Ag, Au, Zn, Al, La, Ce. More preferably the at least one metal M is selected from the group consisting of Cr, Mo, W, Mn, Re, Ru, Co, Rh, Ir, Ni, Pd, Pt, Ag, Au, Ce. Even more preferably the at least one metal M is selected from the group consisting of Co, Cr, Ce and Mn.

Good results, in terms of reduced degradation of a fluorinated ion exchange polymer, have been obtained when the at least one metal M is Ce or Cr.

More than one metal M may be present at the same time in the mixed oxide [MO]. Any combination of more than one metal M may be used and in any ratio. Suitable combinations of more than one metal M are for instance those selected from the group consisting of: the combination of Ce with any one of the metals selected from the group consisting of Cr, Mo, W, Mn, Re, Ru, Co, Rh, Ir, Ni, Pd, Pt, Ag, Au; the combination of Cr with any one of the metals selected from the group consisting of Ce, Mo, W, Mn, Re, Ru, Co, Rh, Ir, Ni, Pd, Pt, Ag, Au; the combination of Mn with any one of the metals selected from the group consisting of Cr, Mo, W, Ce, Re, Ru, Co, Rh, Ir, Ni, Pd, Pt, Ag, Au; the combination of Co with any one of the metals selected from the group consisting of Cr, Mo, W, Mn, Re, Ru, Ce, Rh, Ir, Ni, Pd, Pt, Ag, Au. Preferred combinations are those selected from the group consisting of: the combination of Ce with any one of the metals selected from the group consisting of Cr, Co, Mn; the combination of Co with any one of the metals selected from the group consisting of Cr, Ce, Mn; the combination of Cr with any one of the metals selected from the group consisting of Ce, Co, Mn; the combination of Mn with any one of the metals selected from the group consisting of Cr, Co, Ce.

Good results, in terms of reduced degradation of a fluorinated ion exchange polymer, have been obtained when a combination of Ce and Cr is used as the at least one metal M. Typically, the ratio Ce:Cr may range from 15:1 to 1:15.

In some embodiments mixed oxides [MO] with only one type of metal M are preferred.

The weight ratio Si/M in the mixed oxide [MO], wherein M indicates the total amount of any metal M in the mixed oxide, is at least 1, preferably at least 1.5, more preferably at least 2. The weight ratio Si/M generally does not exceed 40, preferably it does not exceed 25. Typical weight ratios Si/M range from 2.5 to 20.

The amount of inorganic groups —SO$_3$H in the mixed oxide [MO] is typically at least 0.2% of the total amount of atoms of metal M in the mixed oxide [MO], preferably at least 0.5%. The amount of inorganic groups —SO$_3$H in the mixed oxide [MO] may be up to 50%, up to 100% and even higher than 100% with respect to the total amount of atoms of metal M in the mixed oxide as inorganic groups —SO$_3$H may be bound to the Si or oxygen atoms in the mixed oxide [MO].

The amount of inorganic groups —SO$_3$H, metal M and Si in the mixed oxide [MO] can be determined by X-ray fluorescence as generally known to those skilled in the art.

Preferably the mixed oxide [MO] does not contain any organic moiety as above defined.

The inventive mixed oxide [MO] may be prepared by a process which comprises the following steps of:
  a) providing an aqueous suspension comprising SiO$_2$, at least one water soluble salt of metal M and at least one source of inorganic groups —SO$_3$H;
  b) reacting said suspension at a temperature between 30 and 100° C. to form a gel; and
  c) heat treating the gel at a first temperature between 30 and 180° C. and subsequently at a second temperature between 180 and 350° C. to obtain the mixed oxide [MO] in solid form.

In step a) of the process an aqueous suspension is prepared by dispersing in an aqueous phase SiO$_2$, at least one water soluble salt of metal M and at least one source of inorganic groups —SO$_3$H. The aqueous phase may optionally comprise polar solvents such as alcohols.

Any type of SiO$_2$ may be used for the preparation of the mixed oxide, such as colloidal silica, fumed silica and the like. Preferably SiO$_2$ having a particle size of from 1 nm to 100 nm, preferably from 5 to 50 nm is preferred.

Suitable sources of inorganic groups —SO$_3$H for the preparation of the mixed oxide [MO] are for instance those selected from the group consisting of (NH$_4$)$_2$SO$_3$.H$_2$O, $NH_4SO_3NH_2$, $HSO_3Cl$, $Na_2S_2O_5/NaHSO_3$, $(NH_4)HSO_3$, $H_2SO_4$. Preferably the source of inorganic groups —$SO_3H$ is $(NH_4)_2SO_3 \cdot H_2O$.

The expression "water soluble salt of metal M" is used herein to refer to any salt of any metal M whose solubility in water at 20° C. is of at least 10 g/100 mL of water. Notable examples of water soluble salts are for instance nitrates, sulfates and chlorides, preferably nitrates.

The at least one metal M is selected from the group consisting of the elements of Group 4, Group 5, Group 6, Group 7, Group 8, Group 9, Group 10, Group 11 of the periodic table, Al, Zn, La and Ce.

In an advantageous embodiment of the invention the at least one metal M is selected from the group consisting of Co, Cr, Ce and Mn. Non limiting examples of suitable salts for the preparation of the corresponding mixed oxide [MO] are: $Ce(NO_3)_3 \cdot 6H_2O$, $Cr(NO_3)_3 \cdot 9H_2O$, $Co(NO_3)_2 \cdot 6H_2O$, $Mn(NO_3)_2 \cdot 4H_2O$.

In step a) of the process $SiO_2$ is typically from 70 to 90 wt %, preferably 75 to 85 wt % of the total amount of reagents added to the aqueous suspension.

The salt of the at least one metal M is typically from 8 to 20 wt %, preferably 10 to 18 wt % of the total amount of reagents added to the aqueous suspension.

The source of inorganic groups —$SO_3H$ is typically from 2 to 10 wt %, preferably 5 to 7 wt % of the total amount of reagents added to the aqueous suspension.

The aqueous suspension may be prepared by adding $SiO_2$, the water soluble salt of at least one metal M and the at least one source of inorganic groups —$SO_3H$, preferably $(NH_4)_2SO_3 \cdot H_2O$, in any order.

Step b) of the process is carried out, typically under stirring, at a temperature comprised between 30 and 100° C., preferably between 50 and 90° C. $SiO_2$, the at least one water soluble salt of metal M and the at least one source of inorganic groups —$SO_3H$ are allowed to react for at least 10 minutes, preferably for at least one hour. In general the reaction time does not exceed 20 hours, typically it does not exceed 15 hours.

The reaction leads to the formation of a gel. Should a biphasic system form, comprising a gel and a liquid phase, separation of the gel may be carried out according to any procedure known in the art.

The gel obtained in step b) is then subjected to a two step heat treatment process. The first heat treatment is performed at a temperature comprised between 30 and 180° C., preferably between 60 and 180° C., more preferably between 100 and 170° C. The first heat treatment is carried out for a time sufficient to remove water from the gel obtained in step b). Typically the first heat treatment is carried out for at least 30 minutes and generally up to 10 hours. Preferably the temperature of the gel is gradually raised from room temperature to the first heat treatment temperature, for instance by increasing the temperature at a rate of 1 to 5° C./min.

The first heat treatment is followed by a second heat treatment at a temperature comprised between 180 and 350° C., preferably between 200 and 330° C., more preferably between 250 and 320° C. Typically this second heat treatment is carried out for at least 30 minutes and generally it does not exceed 10 hours, preferably from 1 to 5 hours. Preferably the temperature is gradually raised from the first heat treatment temperature to the second heat treatment temperature, for instance by increasing the temperature at a rate of 1 to 5° C./min. At the end of the heat treatment the mixed oxide [MO] in solid form is obtained.

Before use the mixed oxide [MO] may be treated with an aqueous $H_2SO_4$ solution and subsequently dried to convert all the groups on the surface of the mixed oxide [MO] to acid groups and additionally to remove any metal, metal ions and/or ions which may be adsorbed on its surface. The aqueous $H_2SO_4$ solution typically has a concentration of from 0.1 to 3 M, preferably from 0.2 to 2 M. The acid treatment may be carried out at a temperature of from 40 to 80° C.

A further object of the invention is a composition comprising at least one fluorinated polymer comprising —$SO_2X$ functional groups, wherein X is selected from X' or from OZ and wherein X' is selected from the group consisting of F, Cl, Br, I and Z is selected from the group consisting of H, alkaline metals, $NH_4$, and at least one mixed oxide [MO] as detailed above.

The expression "fluorinated" is used herein to refer to compounds (e.g. compounds, polymers, monomers etc.) that are either totally or partially fluorinated, i.e. wherein all or only a part of the hydrogen atoms have been replaced by fluorine atoms. Preferably, the term "fluorinated" refers to compounds that contain a higher proportion of fluorine atoms than hydrogen atoms, more preferably the term refers to compounds that are totally free of hydrogen atoms, i.e. wherein all the hydrogen atoms have been replaced by fluorine atoms.

Within the context of the present invention the expression "at least one" when referred to a "fluorinated polymer" and/or to a "mixed oxide [MO]" is intended to denote one or more than one polymer and/or mixed oxide [MO]. Mixtures of polymers and/or mixed oxide [MO] can be advantageously used for the purposes of the invention.

The composition may comprise the at least one fluorinated polymer in the neutral form, wherein the expression "neutral form" indicates that in the —$SO_2X$ functional groups X is X' and X' is selected from the group consisting of F, Cl, Br, I. Preferably X' is selected from F or Cl. More preferably X' is F.

Alternatively, the composition may comprise the at least one fluorinated polymer in the ionic (acid or salified) form, wherein the expression "ionic form" indicates that in the —$SO_2X$ functional groups X is OZ and Z is selected from the group consisting of H, alkaline metals, $NH_4$.

For the avoidance of doubt, the term "alkaline metal" is hereby intended to denote the following metals: Li, Na, K, Rb, Cs. Preferably the alkaline metal is selected from Li, Na, K.

Fluorinated polymers comprising —$SO_3Z$ functional groups (wherein X=OZ) are typically prepared from fluorinated polymers comprising —$SO_2X'$ functional groups, preferably —$SO_2F$ functional groups, by methods known in the art.

The fluorinated polymer can be obtained in its salified form, i.e. wherein Z is a cation selected from the group consisting of $NH_4$ and alkaline metals, by treatment of the corresponding polymer comprising —$SO_2X'$ functional groups, typically —$SO_2F$ functional groups, with a strong base (e.g. NaOH, KOH).

The fluorinated polymer can be obtained in its acid form, i.e. wherein Z is H, by treatment of the corresponding salified form of the polymer with a concentrated acid solution.

Suitable fluorinated polymers comprising —$SO_2X'$ functional groups are those polymers comprising recurring units deriving from at least one ethylenically unsaturated fluorinated monomer containing at least one —$SO_2X'$ functional group (monomer (A) as hereinafter defined) and recurring units deriving from at least one ethylenically unsaturated fluorinated monomer (monomer (B) as hereinafter defined).

The phrase "at least one monomer" is used herein with reference to monomers of both type (A) and (B) to indicate that one or more than one monomer of each type can be present in the polymer. Hereinafter the term monomer will be used to refer to both one and more than one monomer of a given type.

Non limiting examples of suitable monomers (A) are:

sulfonyl halide fluoroolefins of formula: $CF_2=CF(CF_2)_p SO_2X'$ wherein p is an integer between 0 and 10, preferably between 1 and 6, more preferably p is equal to 2 or 3, and wherein preferably $X'=F$;

sulfonyl halide fluorovinylethers of formula: $CF_2=CF-O-(CF_2)_m SO_2X'$ wherein m is an integer between 1 and 10, preferably between 1 and 6, more preferably between 2 and 4, even more preferably m equals 2, and wherein preferably $X'=F$;

sulfonyl halide fluoroalkoxyvinylethers of formula: $CF_2=CF-(OCF_2CF(R_{F1}))_w-O-CF_2(CF(R_{F2}))_y SO_2X'$ wherein w is an integer between 0 and 2, $R_{F1}$ and $R_{F2}$, equal or different from each other, are independently F, Cl or a $C_1$-$C_{10}$ fluoroalkyl group, optionally substituted with one or more ether oxygens, y is an integer between 0 and 6; preferably w is 1, $R_{F1}$ is $-CF_3$, y is 1 and $R_{F2}$ is F, and wherein preferably $X'=F$;

sulfonyl halide aromatic fluoroolefins of formula $CF_2=CF-Ar-SO_2X'$ wherein Ar is a $C_5$-$C_{15}$ aromatic or heteroaromatic substituent, and wherein preferably $X'=F$.

Preferably monomer (A) is selected from the group of the sulfonyl fluorides, i.e. wherein $X'=F$.

More preferably monomer (A) is selected from the group of the fluorovinylethers of formula $CF_2=CF-O-(CF_2)_m-SO_2F$, wherein m is an integer between 1 and 6, preferably between 2 and 4.

Even more preferably monomer (A) is $CF_2=CFOCF_2CF_2-SO_2F$ (perfluoro-5-sulfonylfluoride-3-oxa-1-pentene).

Non limiting examples of suitable ethylenically unsaturated fluorinated monomers of type (B) are:

$C_2$-$C_8$ fluoroolefins, such as tetrafluoroethylene, pentafluoropropylene, hexafluoropropylene, and hexafluoroisobutylene;

vinylidene fluoride;

$C_2$-$C_8$ chloro- and/or bromo- and/or iodo-fluoroolefins, such as chlorotrifluoroethylene and bromotrifluoroethylene;

fluoroalkylvinylethers of formula $CF_2=CFOR_{f1}$, wherein $R_{f1}$ is a $C_1$-$C_6$ fluoroalkyl, e.g. $-CF_3$, $-C_2F_5$, $-C_3F_7$;

fluoro-oxyalkylvinylethers of formula $CF_2=CFOR_{O1}$, wherein $R_{O1}$ is a $C_1$-$C_{12}$ fluoro-oxyalkyl having one or more ether groups, for example perfluoro-2-propoxy-propyl;

fluoroalkyl-methoxy-vinylethers of formula $CF_2=CFOCF_2OR_{f2}$ in which $R_{f2}$ is a $C_1$-$C_6$ fluoroalkyl, e.g. $-CF_3$, $-C_2F_5$, $-C_3F_7$ or a $C_1$-$C_6$ fluorooxyalkyl having one or more ether groups, like $-C_2F_5-O-CF_3$;

fluorodioxoles, of formula:

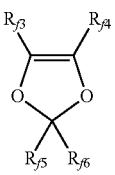

wherein each of $R_{f3}$, $R_{f4}$, $R_{f5}$, $R_{f6}$, equal or different each other, is independently a fluorine atom, a $C_1$-$C_6$ fluoroalkyl, optionally comprising one or more oxygen atom, e.g. $-CF_3$, $-C_2F_5$, $-C_3F_7$, $-OCF_3$, $-OCF_2CF_2 OCF_3$.

Preferably monomer (B) is selected among:

$C_3$-$C_8$ fluoroolefins, preferably tetrafluoroethylene and/or hexafluoropropylene;

chloro- and/or bromo- and/or iodo-$C_2$-$C_6$ fluoroolefins, like chlorotrifluoroethylene and/or bromotrifluoroethylene;

fluoroalkylvinylethers of formula $CF_2=CFOR_{f1}$ in which $R_{f1}$ is a $C_1$-$C_6$ fluoroalkyl, e.g. $-CF_3$, $-C_2F_5$, $-C_3F_7$;

fluoro-oxyalkylvinylethers of formula $CF_2=CFOR_{O1}$, in which $R_{O1}$ is a $C_1$-$C_{12}$ fluorooxyalkyl having one or more ether groups, like perfluoro-2-propoxy-propyl.

More preferably monomer (B) is tetrafluoroethylene.

The fluorinated polymer comprising $-SO_2X'$ functional groups may be prepared by any polymerization process known in the art. Suitable processes for the preparation of such polymers are for instance those described in EP 1323751 A (SOLVAY SOLEXIS SPA) Jul. 2, 2003 and EP 1172382 A (SOLVAY SOLEXIS SPA) Nov. 16, 2002.

The mixed oxide [MO] is present in the composition in any amount sufficient to reduce the degree of radical degradation of the fluorinated polymer.

The amount of mixed oxide [MO] in the composition is such that the moles of metal M per moles of $-SO_2X$ functional groups in the fluorinated polymer are at least 0.1%, preferably at least 0.2%, more preferably at least 0.5%. The amount of mixed oxide [MO] in the composition in terms of moles of metal M per moles of $-SO_2X$ functional groups in the fluorinated polymer generally does not exceed 20%, preferably it does not exceed 15%, more preferably it does not exceed 10%.

The composition may be prepared using conventional methods.

When both the fluorinated polymer and the mixed oxide [MO] are provided in solid form, for instance in the form of powder, pellets or granules the composition may be prepared using techniques such as dry blending, melt blending, or extrusion.

Alternatively the fluorinated polymer and the at least one mixed oxide [MO] may be blended in the presence of a suitable solvent to provide a liquid composition. This method is advantageous for the preparation of compositions wherein the fluorinated polymer comprises $-SO_3Z$ functional groups, wherein Z is as defined above, and in particular $-SO_3H$ functional groups.

The liquid composition may be prepared by a dissolution process wherein fluorinated polymer is contacted with a liquid medium under suitable temperature conditions.

Generally, the liquid composition comprises a water or water/alcoholic mixture as liquid medium, optionally comprising additional ingredients and/or additives.

Suitable alcohols which can be used, in particular as water/alcoholic mixture, are notably methanol, ethanol, propyl alcohols (i.e. isopropanol, n-propanol), ethylene glycol, diethylene glycol.

Other liquid media that can be used are polar aprotic organic solvents such as ketones, like acetone, methylethylketone, esters, like methylacetate, dimethylcarbonate, diethylcarbonate, ethylacetate, nitriles, like acetonitrile, sulphoxides, like dimethylsulfoxide, amides, like N,N-dimethylformamide, N,N-dimethylacetamide, pyrrolidones, like N-methylpyrrolidone, N-ethylpyrrolidone.

Good results have been obtained with liquid compositions wherein the liquid medium is water or a mixture of water and alcohol, preferably of water and propyl alcohol(s).

The liquid composition may advantageously be prepared by contacting the fluorinated polymer with water or a mixture of water and alcohol, at a temperature of from 40° C. to 300° C. in an autoclave.

The mixed oxide [MO] may be added to the liquid composition comprising the fluorinated polymer pure or after having been previously suspended in a solvent, such as those described above.

A further object of the invention is a liquid composition comprising: at least one fluorinated polymer comprising —$SO_2X$ functional groups and at least one mixed oxide [MO] dispersed or dissolved in a liquid medium. Typically the liquid medium is water or a mixture of water and alcohol.

Preferably the fluorinated polymer in the liquid composition is in its ionic form, that is it comprises —$SO_3Z$ functional groups, wherein Z is as defined above, and in particular —$SO_3H$ functional groups.

The liquid composition comprising the at least one fluorinated polymer and the at least one mixed oxide [MO] may optionally comprise additional ingredients.

The composition of the invention is particularly suitable for the preparation of proton exchange membranes and electrocatalytic layers for use in fuel cell applications as the presence of the mixed oxide [MO] of the invention has shown to improve the resistance of fluorinated polymers comprising —$SO_2X$ functional groups towards radical degradation as shown by the longer lifetime of proton exchange membranes obtained therefrom at the conditions of use.

A further object of the present invention is an article comprising at least one fluorinated polymer comprising —$SO_2X$ functional groups and at least one mixed oxide [MO] as defined above.

In a first embodiment the article is a proton exchange membrane for a fuel cell application, herein referred to also as a "membrane".

Compositions comprising the at least one fluorinated polymer, typically comprising —$SO_2X'$ functional groups, preferably —$SO_2F$ functional groups, and the at least one mixed oxide [MO] in solid form may advantageously be converted into membranes by conventional extrusion techniques.

The extruded films can subsequently be converted into ion conducting membranes by hydrolysis, i.e. conversion of the —$SO_2X'$ functional groups into the corresponding —$SO_3H$ functional groups, as discussed above.

Membranes can be obtained from liquid compositions comprising the at least one fluorinated polymer, typically comprising —$SO_3Z$ functional groups, preferably —$SO_3H$ functional groups, and the at least one mixed oxide [MO] using techniques known in the art, such as impregnation, casting, coating, e.g. roller coating, gravure coating, reverse roll coating, dip coating, spray coating.

The membranes may optionally be reinforced, for instance by lamination of the extruded membrane to a suitable reinforcing support or by impregnation of the liquid composition onto a porous support. Suitable supports may be made from a wide variety of components. The porous supports may be made from hydrocarbon polymers such as woven or non-woven polyolefin membranes, e.g. polyethylene or polypropylene, or polyesters, e.g. poly(ethylene terephthalate). Porous supports of fluorinated polymers are generally preferred for use in fuel cell applications because of their high chemical inertia. Biaxially expanded PTFE porous supports (otherwise known as ePTFE membranes) are among preferred supports. These supports are notably commercially available under trade names GORE-TEX®, TETRATEX®.

In a second embodiment the article is an electrocatalytic layer.

Electrocatalytic layers may advantageously be prepared starting from a liquid composition comprising catalyst particles in addition to the at least one fluorinated polymer, typically comprising —$SO_3Z$ functional groups, preferably —$SO_3H$ functional groups, and the at least one mixed oxide [MO]. Said liquid compositions are generally referred to as "catalytic inks". Typical catalyst particles comprise an active compound selected among metals like iron, manganese, cobalt, nickel, platinum, ruthenium, gold, palladium, rhodium, iridium; their electro conductive oxides and alloys. The active compound is generally supported on a suitable material, herein called "carrier", which is preferably electrically conductive. The carrier is advantageously chosen from carbon powder, for instance carbon black.

The amount of catalyst particles (including the carrier, if any) in the catalytic ink is generally of at least 1 wt % based on the total weight of the catalytic ink. Preferably, it is of at least 3 wt % and more preferably of at least 5 wt %. The amount of catalyst particles (including the carrier, if any) in the catalytic ink is advantageously of at most 50 wt % based on the total weight of the catalytic ink, preferably of at most 40 wt % and more preferably of at most 30 wt %.

The electrocatalytic layers may for instance be prepared by screen printing or solution coating the catalyst ink on the surface of a proton exchange membrane. The proton exchange membrane may comprise a mixed oxide [MO], having the same or different composition as the mixed oxide [MO] present in the catalytic ink, or it may be free of the mixed oxide [MO].

In a third embodiment the article is a membrane electrode assembly. The membrane electrode assembly comprises a membrane having first and second surface, a first electrocatalytic layer adhered to said first surface and a second electrocatalytic layer adhered to said second surface, wherein at least one of said membrane, said first or second electrocatalytic layers comprises at least one fluorinated polymer comprising —$SO_2X$ functional groups and at least one mixed oxide [MO] as defined above. When the mixed oxide [MO] is present in more than one component of the membrane electrode assembly it may be the same or different.

All definitions and preferences defined previously within the context of the mixed oxide [MO] or of the process for its preparation apply to the compositions comprising the mixed oxide and a fluorinated polymer composition as well as to any article containing said compositions.

The invention will be now described in more detail with reference to the following examples, whose purpose is merely illustrative and not intended to limit the scope of the invention.

Should the disclosure of any of the patents, patent applications, and publications that are incorporated herein by reference conflict with the present description to the extent that it might render a term unclear, the present description shall take precedence.

EXAMPLES

Characterization

X-ray fluorescence (XRF) analysis was conducted according to standard procedures on the mixed oxide samples to determine the amounts of Si, S, and of the metal M. XRF analysis of the samples was carried out with a Bruker AXS S4 Explorer spectrometer operating at a power of 1 kW and equipped with a Rh X-ray source, a LiF 220 crystal analyzer and a 0.12° divergence collimator.

X-ray photoelectron spectroscopy (XPS) analysis was performed to characterize the surface properties of the mixed oxide in terms of oxidation states and binding energies. XPS measurements were performed by using a Physical Electronics (PHI) 5800-01 spectrometer. A monochromatic Al Kα X-ray source was used at a power of 350 W. Spectra were obtained with pass energies of 58.7 eV for elemental analysis (composition) and 11.75 eV for the determination of the oxidation states. The pressure in the analysis chamber of the spectrometer was $1\times10^{-9}$ Torr during the measurements. The Ag 3d5/2 peak of an Ag foil was taken, after argon sputtering, for checking the calibration of the binding energy scale. The quantitative evaluation of each peak was obtained by dividing the integrated peak area by atomic sensitivity factors, which were calculated from the ionization cross-sections, the mean free electron escape depth and the measured transmission functions of the spectrometer. XPS data were interpreted by using the on-line library of oxidation states implemented in the PHI MULTI-PAK 6.1 software and the PHI Handbook of X-ray photoelectron spectroscopy. Deconvolution of the XPS spectra was carried out by using the MULTIPAK software.

Example 1

General Procedure for the Preparation of Mixed Oxides [MO] According to the Invention In a closed vessel $SiO_2$ (Cab-o-sil® EH-5 supplied by Cabot Corp.), a water soluble inorganic salt of the metal M and $(NH_4)_2SO_3.H_2O$ were suspended in water.

The weight ratio $SiO_2$: salt of metal M: $(NH_4)_2SO_3.H_2O$ was 8:1.5:0.5. The slurry was stirred at 80° C. for 10 h providing a gel. The gel thus obtained was heat treated according to the following conditions:
 from room temperature to 150° C. (1 h ramp, 2.5° C./min);
 2 h at 150° C.;
 from 150° C. to 300° C. (1 h ramp, 2.5° C./min);
 2 h at 300° C.

The powder obtained at the end of the heat treatment was cooled down to room temperature and then washed with 0.5M $H_2SO_4$ solution at 70° C. until no change in the amount of metal M and sulphur was determined by XRF analysis of the sample. The powder was dried under vacuum at 80° C. for 2 h and then ground in a planetary ball mill for 2 h at 200 rpm.

Table 1 lists the mixed oxides prepared as well as their composition.

TABLE 1

| Sample | Water soluble salt | Si/M | % —SO$_3$H vs M |
|---|---|---|---|
| [MO—Ce] | Ce(NO$_3$)$_3$•6H$_2$O | 3.8 | 1.6 |
| [MO—Co] | Co(NO$_3$)$_2$•6H$_2$O | 3.4 | 1.2 |
| [MO—Cr] | Cr(NO$_3$)$_3$•9H$_2$O | 3.4 | 13.3 |
| [MO—Mn] | Mn(NO$_3$)$_3$•4H$_2$O | 8.1 | 0.7 |
| [MO—Ce—Cr] | Ce(NO$_3$)$_3$•6H$_2$O | 35.6 | 33.4 |
| | Cr(NO$_3$)$_3$•9H$_2$O | 4.1 | 3.8 |

A mixed oxide of Ce and Cr was prepared according to the same general procedure by mixing $SiO_2$, Ce(NO$_3$)$_3$.6H$_2$O, Cr(NO$_3$)$_3$.9H$_2$O and $(NH_4)_2SO_3.H_2O$ in water in a weight ratio $SiO_2$: salt of Ce: salt of Cr: $(NH_4)_2SO_3$. $H_2O$ of 8:0.75:0.75:0.5. The ratio Ce:Cr in the resulting mixed oxide [MO-Ce—Cr] was 1:9.

Example 2

Preparation of a Fluorinated Polymer (P1) Comprising —SO$_3$H Functional Groups

In a 22 L autoclave the following reagents were charged:
 11.5 L of demineralised water;
 980 g of the monomer with formula: $CF_2$=CF—O—$CF_2CF_2$—$SO_2F$
 3100 g of a 5% weight solution of $CF_2ClO(CF_2CF(CF_3)O)_n(CF_2)_mCF_2$COOK in water (average molecular weight=521, ratio n/m=10).

The autoclave, stirred at 470 rpm, was heated at 60° C. A water based solution with 6 g/L of potassium persulfate was added in a quantity of 150 mL. The pressure was maintained at a value of 12 bar (abs) by feeding tetrafluoroethylene.

After adding 1200 g of tetrafluoroethylene in the reactor, 220 g of the monomer $CF_2$=CF—O—$CF_2CF_2$—$SO_2F$ were added every 200 g of tetrafluoroethylene fed to the autoclave.

The reaction was stopped after 280 min by stopping the stirring, cooling the autoclave and reducing the internal pressure by venting the tetrafluoroethylene; a total of 4000 g of tetrafluoroethylene were fed.

The latex was then coagulated by freezing and thawing and the recovered polymer was washed with water and dried at 150° C. for 24 hours. The polymer was then treated with fluorine gas in a metallic vessel for 8 hours at 80° C., then purged several hours with nitrogen to remove any residual unstable end-groups.

The polymer thus obtained was immersed in a KOH solution (10% by weight) at 80° C. for 8 hours, followed by washing in demineralised water at room temperature. Immersion in a HNO$_3$ solution (20% by weight) at room temperature for 2 hours, followed by washing in demineralised water at room temperature converted all functional groups into —SO$_3$H functional groups.

The resulting fluorinated polymer in —SO$_3$H form (P1) was then dried in a vacuum oven at 80° C. The equivalent weight of the polymer (EW) was determined (by IR analysis on the precursor polymer) to be 790 g/eq.

Example 3

Liquid Compositions Comprising P1 and the Mixed Oxides Prepared in Example 1

Each one of the mixed oxides prepared in Example 1 was suspended at room temperature in 1-propanol ([MO]/1-propanol=1/50 w/w) and then sonicated for 2 h obtaining complete dispersion of the solid. Solid content in dispersion was determined using a thermobalance (160° C., 45 min). The dispersion of the mixed oxide thus obtained was then added to a water dispersion of P1 (100 g) further comprising 1-propanol (36 g) and N-ethyl pyrrolidone (15.5 g). This mixture was stirred at room temperature for 15 min obtaining a clear solution.

The amount of the mixed oxide [MO] and of P1 added in the preparation of each of the liquid compositions was calculated to obtain a final concentration of the metal in the composition of 1% moles of metal M/moles of —SO$_3$H groups in the fluorinated polymer P1.

Example 4

Membrane Preparation—General Procedure

Foamed PTFE support (TETRATEX® #3101), having an average pore diameter of 0.2 μm (as specified in the product datasheet) and a thickness of 35±10 μm, mounted on a PTFE circular frame having an internal diameter of 100 mm, was immersed in each of the liquid compositions obtained in Example 3 as well as in a liquid composition containing polymer P1 alone and then dried in a vent oven at a temperature of 65° C. for 1 h, at 90° C. for 1 h and then from 90° C. to 190° C. in 1 h.

The membranes thus obtained were transparent and colourless indicating full occlusion of the pores of the support. The thickness of the resulting membranes was 25±5 μm.

Example 5

Fuel Cell Characterization of Membranes Prepared in Example 4

Membranes obtained as described in Example 4 were assembled in a single cell (Fuel Cell Technology®) with an active area of 25 cm$^2$ and tested on an Arbin® 50W test stand. The membranes were assembled with E-TEK® LT250EW gas diffusion electrodes (0.5 mg/cm$^2$ Pt).

After 24 hours conditioning at a fixed voltage of 0.6 V a polarization curve was measured to verify the membrane performance. The conductivity of membranes containing the mixed metal oxides of the invention was found not to differ from the conductivity of reference membrane (M1).

The membranes were tested at the following operating conditions:

Anode side flow: 500 sccm pure H$_2$, 64° C. dew point, 1 bar (abs)
Cathode side flow: 500 sccm pure O$_2$, 64° C. dew point, 1 bar (abs)
Cell temperature: 90° C.
Open circuit voltage condition (=current zero ampere).

The voltage was monitored during the test. The end of test was set at a voltage below 0.7 V, which is typically assumed to indicate the formation of pinholes in the membrane. The results are reported in Table 2.

TABLE 2

| Membrane | Time to reach voltage <0.7 V (hours) |
| --- | --- |
| M1 (reference) | 230 |
| M-Ce | 1400 |
| M-Co | 450 |
| M-Cr | 600 |
| M-Mn | 400 |
| M-Ce—Cr | >600 |

With respect to a membrane comprising fluorinated polymer (P1) alone (reference membrane M1) the membranes comprising the mixed oxides of the invention show a significant increase in stability under fuel cell operating conditions.

Example 6 And Comparative Example 1

Membranes Comprising [MO-Ce] and Ce(III)

A liquid composition was prepared as described in Example 3 starting from [MO-Ce] prepared in Example 1 and polymer P1 to obtain a final concentration of cerium in the composition of 2.5% moles of Ce/moles of —SO$_3$H groups in fluorinated polymer P1.

A second liquid composition containing fluorinated polymer P1 and 2.5% moles of Ce(III) ions per moles of —SO$_3$H groups in fluorinated polymer P1 was prepared by dissolving Ce(NO$_3$)$_3$.6H$_2$O in the liquid composition of P1.

A membrane was prepared from each liquid composition following the general procedure described in Example 4.

The membranes were assembled in a single fuel cell as described in Example 5 and each fuel cell resistance measured under the following operating conditions:

Anode side flow: air, Cathode side flow: pure H$_2$,
Cell temperature: 65° C.
Reactant Humidity level: 125% (70° C. dew point)
Current intensity: from 2 A to 16 A The test showed that the cell prepared with the membrane containing [MO—Ce] exhibits a lower resistance than the cell prepared with Ce(III) ions (60 vs. 70 mOhm·cm$^{-2}$). The lower resistance of the membrane containing the inventive mixed oxide [MO] is associated with the higher number of available conductive —SO$_3$H groups in fluorinated polymer P1, that is to the lower number of —SO$_3$H groups in fluorinated polymer P1 which are ionically coordinated with Ce ions. The lower resistance is constant over prolonged period of times as shown by the comparison between 0 h vs. 100 h of fuel cell operation (62 vs 60 mOhm·cm$^{-2}$).

Thus, the use of the mixed oxide of the invention is advantageous over the use of prior art systems containing soluble forms of the metal M in that the metal M in the mixed oxide improves the stability of the membrane over time (as shown by the data in Table 2) without increasing the electrical resistance of the membrane. Additionally, as the metal M is contained in the mixed oxide lattice, it is believed to be more stable towards leaching during the operation of the fuel cell for longer periods of time.

The invention claimed is:

1. A mixed oxide of Si and at least one metal M, said oxide comprising inorganic groups —SO$_3$H, wherein the inorganic groups —SO$_3$H are not bound to any moiety containing at least one carbon atom.

2. The mixed oxide according to claim 1 wherein the inorganic groups —SO$_3$H are bound via the sulphur atom to at least one Si, metal M or oxygen atom of the mixed oxide.

3. The mixed oxide according to claim 1 wherein the weight ratio Si/M is at least 1 and it does not exceed 40.

4. The mixed oxide according to claim 1 wherein the inorganic groups —SO$_3$H are at least 0.2% with respect to the total amount of atoms of metal M in the mixed oxide.

5. The mixed oxide of claim 1 wherein the at least one metal M is selected from the group consisting of the elements of Group 4, Group 5, Group 6, Group 7, Group 8, Group 9, Group 10, Group 11 of the periodic table, Zn, Al, La and Ce.

6. The mixed oxide of claim 1 wherein the at least one metal M is selected from the group consisting of Ce, Co, Cr, Mn.

7. A process for the preparation of the mixed oxide of claim 1 comprising:
reacting an aqueous suspension comprising SiO$_2$, at least one water soluble salt of metal M and at least one source of inorganic groups —$SO_3H$ at a temperature between 30 and 100° C. to form a gel; and heat treating the gel at a first temperature between 30 and 180° C. and subsequently at a second temperature between 180 and 350° C. to obtain the mixed oxide in solid form.

8. A composition comprising at least one fluorinated polymer comprising —$SO_2X$ functional groups, wherein X is selected from X' or from OZ and wherein X' is selected from the group consisting of F, Cl, Br, I and Z is selected from the group consisting of H, alkaline metals, $NH_4$, and at least one mixed oxide of claim 1.

9. The composition according to claim 8 wherein the at least one mixed oxide is present in an amount of at least 0.1% and not exceeding 20% moles of metal M/moles of —$SO_2X$ functional groups in the fluorinated polymer.

10. A liquid composition comprising the composition of claim 8 dispersed in a liquid medium.

11. The liquid composition of claim 10 wherein in the fluorinated polymer X=OZ and Z=H.

12. A process for the preparation of a composition according to claim 8 comprising blending the at least one mixed oxide and the at least one fluorinated polymer comprising —$SO_2X$ functional groups in solid form or in a solution.

13. An article comprising the composition of claim 8.

14. The article according to claim 13 which is a proton exchange membrane, an electrocatalytic layer or a membrane electrode assembly.

15. A process for the preparation of the article of claim 13 comprising impregnating, casting or coating a liquid composition, wherein the liquid composition comprises at least one fluorinated polymer comprising —$SO_2X$ functional groups and at least one mixed oxide of Si and at least one metal M, said oxide comprising inorganic groups —$SO_3H$ dispersed in a liquid medium, and wherein X is selected from X' or from OZ and wherein X' is selected from the group consisting of F, Cl, Br, I and Z is selected from the group consisting of H, alkaline metals, $NH_4$.

16. A fuel cell comprising the article of claim 13.

* * * * *